United States Patent [19]
van Essen et al.

[11] 4,081,578
[45] Mar. 28, 1978

[54] IN-MOLD COATING COMPOSITION AND METHOD OF APPLYING SAME

[75] Inventors: Willem J. van Essen, Tallmadge; Henry Shanoski, Akron; Richard M. Griffith, Silver Lake, all of Ohio

[73] Assignee: The General Tire & Rubber Company, Akron, Ohio

[21] Appl. No.: 620,515

[22] Filed: Oct. 8, 1975

Related U.S. Application Data

[63] Continuation of Ser. No. 483,490, Jun. 27, 1974, abandoned, which is a continuation of Ser. No. 394,029, Sep. 4, 1973, abandoned.

[51] Int. Cl.² .......................... B29C 5/00; B29D 9/00
[52] U.S. Cl. ...................................... 428/63; 264/247; 264/255; 264/259; 264/296; 427/370; 427/385 B; 427/407 G; 428/425; 428/482
[58] Field of Search ............... 264/134, 250, 255, 294, 264/300, 137, 259, 331, 245, 46.4, 45.1, 247, 296; 428/480, 425, 423, 63, 482; 156/331; 427/370, 385 B, 407 G

[56] References Cited

U.S. PATENT DOCUMENTS

| | | | |
|---|---|---|---|
| 3,448,172 | 6/1969 | Damusis et al. | 260/77.5 CR |
| 3,516,957 | 6/1970 | Gray et al. | 264/300 |
| 3,597,425 | 8/1971 | Shaines | 264/255 |
| 3,703,426 | 11/1972 | Larsen et al. | 156/308 |
| 3,715,337 | 2/1973 | Allen et al. | 260/33.2 R |
| 3,741,799 | 6/1973 | Kulhanek | 427/409 |
| 3,940,468 | 2/1976 | Tunstall | 428/480 |

*Primary Examiner*—Willard E. Hoag

[57] ABSTRACT

An in-mold coating composition is disclosed which includes (a) an isocyanate-terminated material containing an excess of reactive isocyanate groups and (b) a material selected from the group consisting of a composition containing reactive hydrogen atoms, generally hydroxyl groups, and a catalyst capable of trimerizing the terminal isocyanate groups. The coating composition is applied to a molded substrate, such as an FRP part, by placing a charge of the composition in the mold on the substrate, the charge being sufficient to provide a coating having a thickness less than about 20 mils. Appropriate pressure is then applied to the charge, such as by closing the mold, so that the coating composition is forced to cover substantially the entire surface area of the substrate, filling any surface defects. The composition is cured to yield a crosslinked, isocyanate-based coating which adheres tightly to the substrate.

21 Claims, 5 Drawing Figures

IN-MOLD COATING COMPOSITION AND METHOD OF APPLYING SAME

This application is a continuation of copending patent application Ser. No. 483,490, filed June 27, 1974 which in turn was a continuation of copending patent application Ser. No. 394,029, filed Sept. 4, 1973, both now abandoned.

BACKGROUND OF THE DISCLOSURE

Field of the Invention

This invention relates to molded thermosetting articles, and especially FRP (fiber-reinforced-plastic) articles, and more particularly, to coating compositions and methods for applying them to cover surface defects such as sink marks, porosity, microcracks and open (cracked) knit lines.

There has been increasing commercial interest in parts which are molded (generally compression molded) from resinous thermosetting materials. The materials most commonly used are resins such as polyester which are reinforced with fibers. The mixture of resin compound and reinforcing fibers, principally glass fibers, is generally formed into either a sheet molding compound (SMC) or a bulk molding compound (BMC). It is the SMC or BMC which is compression molded to form the desired part or substrate.

Among the commercially molded FRP parts, there are many which include ribs and bosses projecting downward from the underside of a relatively thin section on which it is desirable that the top surface be smooth and defect-free. A major disadvantage of molded parts having such a configuration is the appearance of surface depressions (commonly called "sink marks") on the top surface, opposite the ribs and/or bosses. It has been hypothesized that such sink marks are the result of uneven shrinkage of the resin material after curing of the part, even when the material is a "low shrink" or "low profile" polyester resin. The actual shrinkage occurs as the part cools, subsequent to the curing cycle, and manifests itself as a sink mark opposite a boss or rib, or any other thicker section, partly because it is at such thicker sections that a given shrinkage percent for a particular resin compound will result in a larger total amount of shrinkage.

In contrast to sink marks, which occur primarily over thickened sections, porosity may be found anywhere on the surface of the molded part, and is caused primarily by air entrapment and insufficient dispersion of certain substituents of the molding compound, such as the filler or reinforcing fibers. The major problems caused by porosity are associated with the painting of the part, and the durability of the paint. In particular, solvent from the paint can be trapped in the pores, ultimately causing a "paint pop."

A third type of defect (not necessarily a "surface defect") is microcracks which occur generally in areas of low glass content or high filler content and the result is a localized failure, caused ultimately by thermal or chemical shrinkage. These cracks which open to the surface of the part can cause paint problems similar to porosity.

Such surface defects are undesirable for two different but related reasons. First, many of the uses for molded FRP parts, especially automotive uses, require that the plastic part be capable of achieving the same smooth, glossy surface finish as painted sheet steel, in order for molded thermosets to be useable with, or compete with, i.e., replace, sheet steel. Secondly, when a molded FRP part has defects on a surface where a good finish is desired, it is necessary to repair the defects after the molding operation by filling them with a sealer and sanding the area after the sealer has hardened. In addition to these extra process steps which are required to repair defects, at least one reinspection is also generally required. If these extra manufacturing steps can be eliminated, not only would the cost of producing such a part be reduced, but also, increased competitiveness in price would open new markets to molded FRP parts.

DESCRIPTION OF THE PRIOR ART

One of the best known of the methods for applying a cured resinous coating to a thermoset part is by gel coating, in which the gel coating material is applied to the mold surface and allowed to partially cure. Next, the mixture of resin compound and glass fibers is applied to the layer of gel coat and rolled, after which the composite of the resin and gel coat are allowed to cure. This method relies on co-crosslinking of the gel composition and the polyester resin at room temperature. It is apparent that this conventional gel coating method is inadequate for the production of either a very large number of moldings, or of precision moldings. Among the commonly used gel coating materials are thermoset resins such as certain polyesters and melamine formaldehyde. Another approach to coating a thermosetting substrate has been the lamination to the substrate of a paper impregnated with a resinous material (e.g., polyester). This is normally done in the compression mold, but because it doesn't flow well, it has a tendency to tear when being applied to non-horizontal surfaces where the separation between the matched metal molds is reduced.

In the area of thermoplastic molding, it is a known practice to coat such moldings with a second thermoplastic material by merely heating the materials and fusing them together. It is obvious, however, that this technique has no utility with respect to the coating of cured thermosetting articles, especially high strength engineering materials such as FRP.

SUMMARY OF THE INVENTION

Accordingly, it is an object of the present invention to provide a method for producing a molded thermosetting part which substantially eliminates surface defects such as sink marks, porosity, microcracks, open knit lines and surface waviness.

It is a related object of the present invention to provide a coating composition usable in such an improved molding process, whereby the coating composition adheres tightly to the molded thermosetting part.

It is a more detailed object of the present invention to provide a method for applying an "in-mold" coating to a compression molded part.

It is also an object of the present invention to provide an "in-mold" coating composition and method whereby the surface of a molded thermosetting part can be sealed and/or a pigmented coat applied thereto in one operation in the mold.

It is a further object of the present invention to provide a coating compound and method for applying the same to a cured, thermosetting substrate in the mold in which the substrate was formed.

It is another object of the present invention to provide a coating compound and method for applying the same which improves the surface properties of the thermosetting substrate.

These and other objects of the present invention which will become apparent upon a reading of the following detailed description, are accomplished by the provision of a method of covering a molded substrate, in a mold, with a coating whereby surface defects are substantially eliminated. The method comprises:

a. placing in said mold a charge of coating composition, said charge being sufficient to provide on the substrate a coating having a thickness less than about twenty mils (about 0.5 m.m.);
b. closing the mold and applying sufficient pressure to said charge to cause the coating composition to substantially cover the surface of the substrate, the coating composition including:
   (i) an isocyanate-terminated material containing unreacted isocyanate groups; and
   (ii) a material selected from the group consisting of a composition containing reactive hydrogen atoms and a catalyst capable of trimerizing the terminal isocyanate groups;
c. curing said coating composition to yield a defect free coating which is chemically bonded to the substrate.

DESCRIPTION OF THE PREFERRED EMBODIMENT

In describing the present invention, the term "in-mold" coating is used to distinguish it from gel coating for two reasons. First, because a conventional gel coat might have a thickness of about 15 mils or more, whereas the coating described herein would preferably be in the same thickness range as a coat of paint, from about 0.5 mils to about 5.0 mils. Second, the methods of application are different, in that the present invention contemplates coating an article in the mold in which the article is formed after it cures. Therefore, while the coating composition and method are especially advantageous when used in connection with compression molding, it should be understood that the invention is equally applicable to other types of molding, for example, injection molding.

THE METHOD

Figure 1:
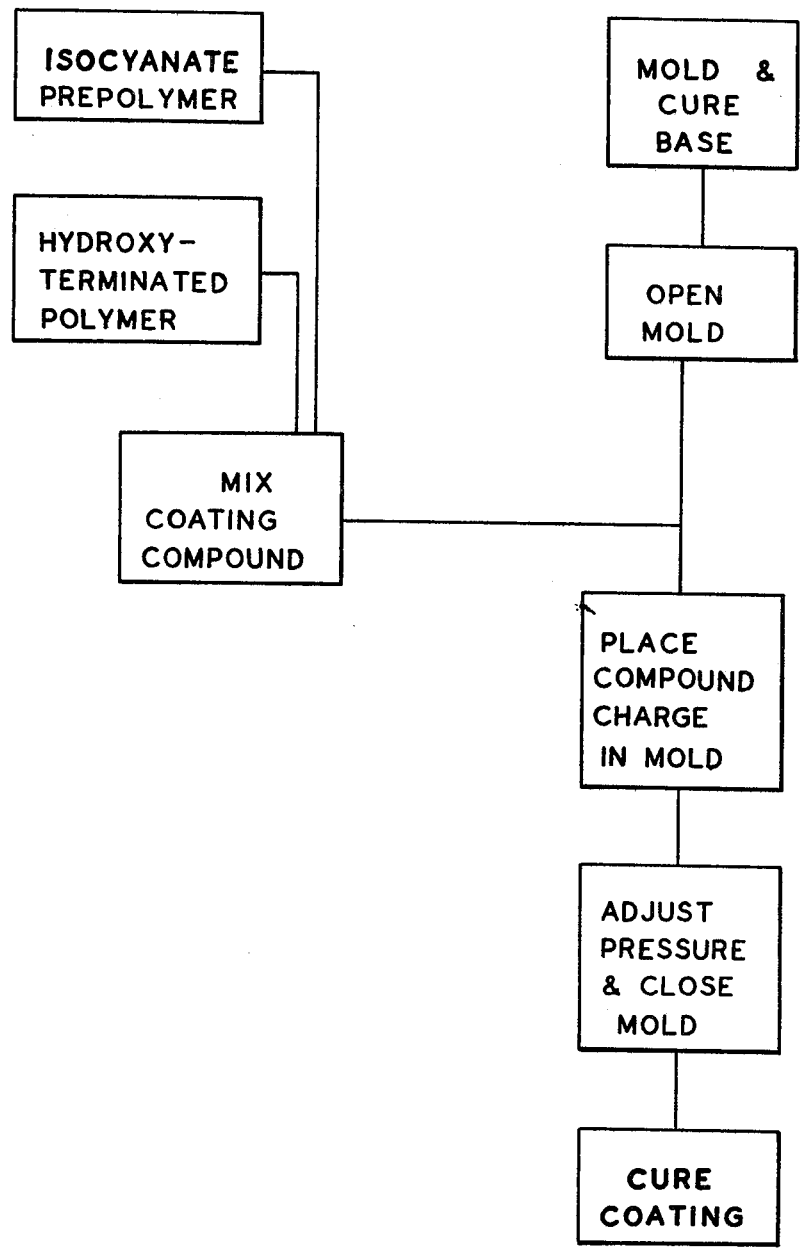
FIG. 1 is a flow diagram illustrating the preferred method of the present invention.

Referring now to the drawings which are for the purpose of illustrating preferred embodiments of the present invention and not for limiting the same, FIG. 1 is a flow diagram illustrating one preferred form of the method described herein.

As mentioned above, the preferred molding method for practicing the present invention is compression molding, and the invention will be described in connection therewith. In making a molded, composite article including a molded thermosetting substrate and in isocyanate-base coating, the first step is to compression mold the part in accordance with conventional compression molding techniques. While the substrate may be compression molded from any one of a number of thermoset resins, the most important commercially are the polyester resins, especially those which are reinforced with glass fibers. Polyester resins generally are blends of unsaturated polyester resins and cross-linkable monomers. Polyesters are made by esterifying (condensing) polycarboxylic acids or anhydrides and glycols, using methods and acids and glycols that are well-known in the art. Below is given a recipe for the particular substrate used most commonly in the development of the present invention, listing the ingredients and the respective number of parts by weight:

| Ingredient | Parts |
| --- | --- |
| Paraplex P340 (1) | 4000 |
| Paraplex P681 (2) | 2240 |
| Paraplex P543 (3) | 772 |
| Camel Wite (4) | 10,520 |
| TBP (5) | 70 |
| Zinc Stearate | 350 |
| Mg (OH)$_2$ | 316 |
| Glass Fibers | 7830 |
| | 26,098 |

Notes:
(1) A 65% solution of polyester in styrene, the polyester being essentially polypropylene fumarate, Rohm & Haas.
(2) A low-shrink additive, a 35% solution (containing some carboxyl groups) of polymethyl methacrylate in styrene monomer, Rohm & Haas.
(3) A low-shrink additive, a 35% solution (no carboxyl groups) of polymethyl methacrylate in styrene monomer, Rohm & Haas.
(4) A calcium carbonate filler.
(5) Tertiary butyl perbenzoate, a peroxide initiator for the polyester and styrene reaction.

Therefore, while the present invention is applicable to any molded thermosetting substrate, it is especially useful for FRP parts, and will be discussed in connection therewith.

The step of the method which will be described next may optionally be performed first. This step is the mixing of the coating compound, which, because of the reactive nature of the two components should generally not occur more than a few minutes, or at the most a half hour before the coating compound is used. The formation of the coating compound involves the mixing of an isocyanate-terminated material (possibly a prepolymer) which includes an excess of reactive isocyanate groups with a material which contains either reactive hydrogens, such as a polyhydroxyl compound, or a catalyst capable of trimerizing the terminal NCO groups. By "excess" is meant that there are more moles of NCO than there are reactive H atoms. Under heat and pressure, the isocyanate and polyhydroxyl compound or catalyst can react to yield an isocyanate-based coating which adheres tightly when applied to the molded part, in accordance with the method of the present invention.

As mentioned previously, porosity can be the result of air entrapment and/or poor dispersion of the ingredients of the molding compound. Thus, because it is normally desirable for the in-mold coating to yield an improved surface finish, the coating composition should have its substituents more thoroughly dispersed by means of extra stirring. In addition, the composition should preferably be degassed to eliminate trapped air and should contain less filler than the molding compound for the substrate to make the coating as homogeneous as possible. For example, the substrate recipe contains a total of 26,098 parts, of which 18,350 (about 70%) are filler and fibers, whereas the in-mold coating compositions typically contain no more than about 20 percent by weight of filler (inorganic).

At the end of the molding cycle of the substrate, the mold is opened, but only after the substrate is completely cured, because if the pressure is released before the substrate is completely cured, it may be ruptured, either by gas expanding from within the substrate, or by the surface of the substrate sticking to the mold. If the present invention is applied to compression molding, the mold must be opened enough to place the charge of coating compound therein, on the surface of the thermosetting substrate to be coated. In another type of molding such as injection molding, however, opening the mold enough to insert the charge means opening it by an amount equal to the desired thickness of the coating to permit injection of the compound.

At this point, a charge of the coating compound may be applied to the FRP substrate in the same mold (either compression or injection) in which the substrate was formed, or in a different mold by removing the part from the first mold and transferring it to a second. In order to minimize handling of the molded substrate, it will normally be desirable to perform both molding operations in the same molding press, but to increase productivity or for other reasons, it may occasionally be desirable to use a different press for the second molding cycle. Therefore, references to "opening the mold" and "placing a charge . . . in the mold" are intended to include and apply to both the mold in which the substrate is formed and a special second mold used only for molding the coating. In any event, a charge of the coating composition is placed in the mold, either on the surface of the FRP part which is to be coated, or on the surface of the mold adjacent the surface to be coated.

It has been found in practicing the present method that it isn't necessary to thoroughly clean the FRP part (e.g., to solvent wipe to get the mold release, oils, etc., off of the surface) before applying the in-mold coat. Instead, it is necessary only to remove any loose flash remaining on the part, because it is no longer necessary to prime the substrate before painting over the in-mold coating.

In developing the coating compounds and methods described herein, it was found that the compound preferably has such a consistency that it will not run off the substrate, but yet, the closing of the press will cause the compound to spread over substantially the entire area of the surface to be coated in a generally uniform layer of less then about 20 mils thickness, and preferably from about 0.5 to about 5.0 mils (about 0.01 to about 0.1 m.m.).

After placing the charge of coating compound on the FRP substrate, the second molding cycle can then be initiated by closing the press, although, as previously mentioned, it is often necessary to readjust the molding pressure before the second cycle. In the case of compression molding, "closing the press" means just that, whereas, in injection molding the mold is "closed" by injecting the compound to fill the space between the mold and the molded substrate.

Figure 3:
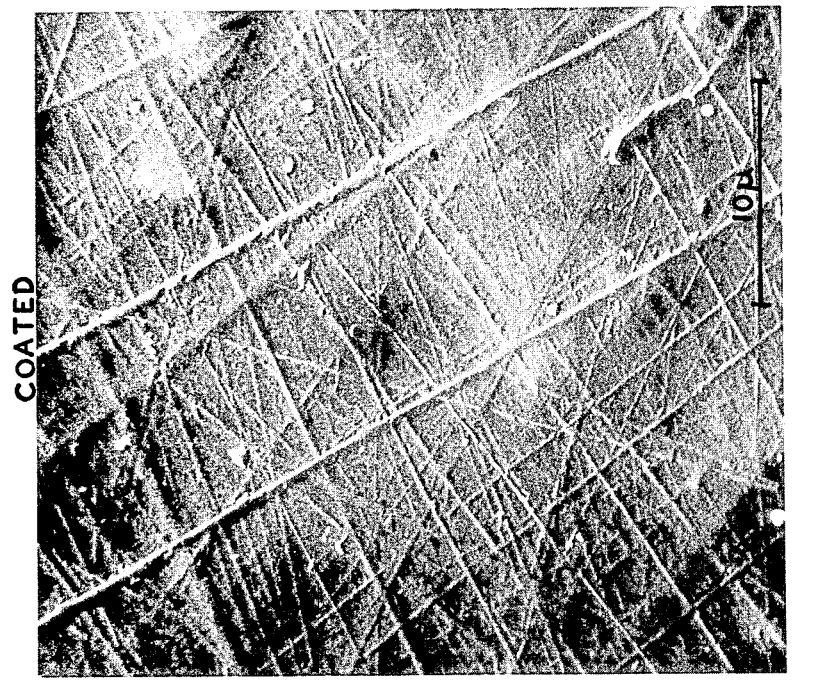
FIG. 3 is a photographic comparison made with a scanning electron microscope (magnification 4000×) of an uncoated FRP surface and one coated according to the present invention.
Figure 3:
Figure 4:
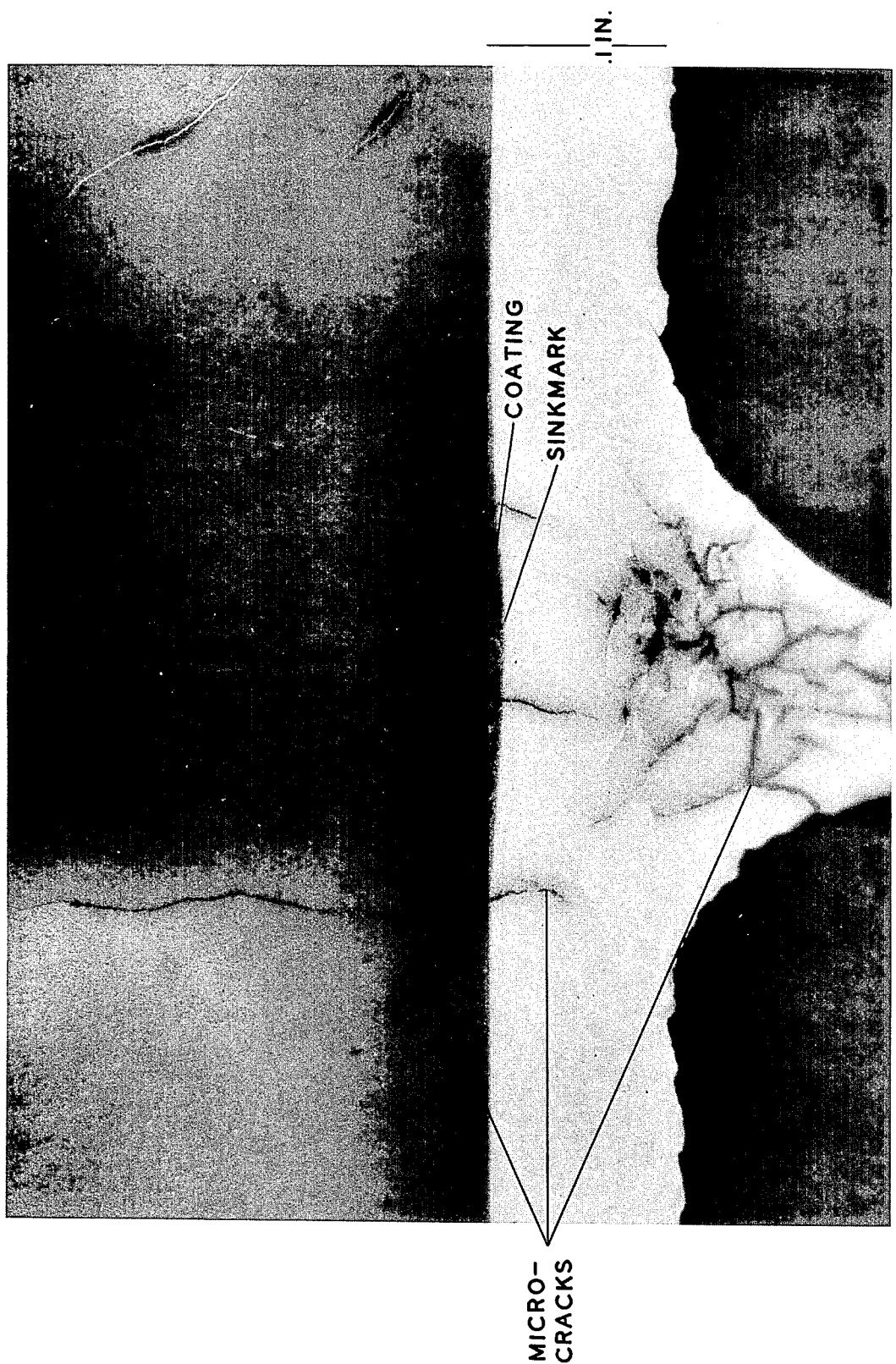
FIG. 4 is a photographic perspective of a cross-section of a coated FRP part including a rib.

The appropriate molding pressure for this second cycle should be determined empirically for each configuration of part, in such a way that the surface of the in-mold coating, where it has covered a surface defect, will be continuous and substantially smooth, i.e., it will conform substantially to the theoretical configuration of the mold forming the coating. This phenomenon can best be seen in FIG. 4, for which the substrate was molded from a polyester resin containing no "low-shrink" additive, to accentuate the sink marks. The coating composition was darkly pigmented in order to emphasize the fact that after cooling, the coating is thicker where necessary to fill a sink mark, while at the same time providing a flat, smooth surface (see darkened area above sink mark). It should also be noted that the microcracks have been filled with the coating composition, including not only the cracks which are adjacent the surface, but also those below the sink mark at the upper portion of the rib, but opening to the surface. FIG. 3 illustrates the same type of sealing, but in connection with porosity which, as discussed previously, has made the painting of molded plastic parts extremely difficult, prior to the present invention. As can be seen from the view of the uncoated surface, the pores are generally in the range of about 1 to about 3 microns, whereas the coated surface contains no pores or other defects which are visible, even at the 4000× magnification. The lines appearing on the coated surface are raised portions resulting from micro-scratches on the surface of the mold and, being only a fraction of a micron (in width and height), they don't appreciably affect the surface finish or gloss. Because of the porosity, the uncoated surface is too rough for such lines to even be formed.

It appears that the molding of the in-mold coat operates on the same principle which causes the original problem of sink marks, i.e. the shrinkage of the resin compound as it cools after curing. A close inspection of parts coated in accordance with the invention has shown raised areas of the coating compound over the sink marks, immediately after the part is removed from the mold at the end of the second cycle. Subsequent inspection after the coating has had a chance to cool has shown that the shrinkage of the coating compound occurs in such a way that when it cools to its permanent configuration, the coating has the desired surface configuration, with neither a sink mark nor a raised area of any substantial amount. This appears to be true, however, only if the right amount of molding pressure is applied during the second cycle (the molding of the coating), and if too little pressure is applied, a sink mark will still appear after the part cools, whereas if too much pressure is applied, a raised portion will appear. In view of these observations, it has been hypothesized that, during the second molding cycle, the thicker portions of the cured FRP substrate are compressed more, thus allowing a greater amount (thickness) of the coating compound to cover the surface (and the sink marks) in those areas. Then when the molding pressure is released at the end of the second cycle, the substrate returns to its uncompressed condition, and the excess amount of coating compound also reaches an unstressed condition; thus, resulting in a raised portion in that area where there would otherwise be a sink mark. During cooling, the greater thickness of the compound over the sink marks equals the greater absolute amount of shrinkage of the base part and the compound in those areaw as compared to the remainder of the surface, with the end result being a substantially smooth (i.e., conforming to the shape of the female mold) surface on the finished article where there had formerly been sink marks, waviness, and other surface defects on the molded part. It should be clearly understood, however, that this is merely one theory, and the present invention and the scope thereof is in no way dependent upon any particular mode of operation. To summarize, in order to obtain such a flat surface on the composite article, it is necessary to empirically correlate the depth of the sink mark or other defect, the compressibility of the FRP substrate, the shrink characteristics of the coating compound, the thickness of the coating, and the molding pressure for the second mold cycle. As will be illustrated in the example below, the compressibility of the FRP part is a function not only of the particular FRP material, but also of the geometry of the part.

EXAMPLE 1

Figure 2:
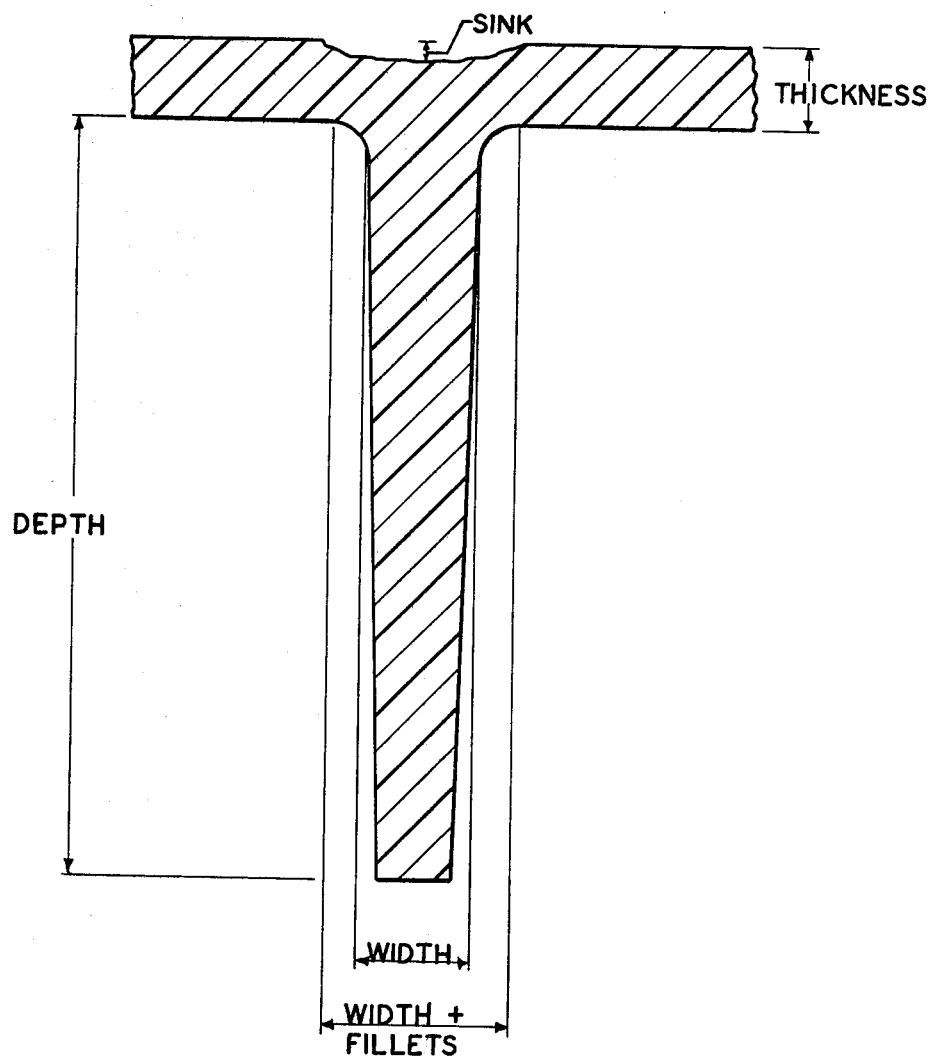
FIG. 2 is a cross section of a typical molded part containing a rib or a boss, illustrating the dimensions referred to in Example 1.
Figure 5:
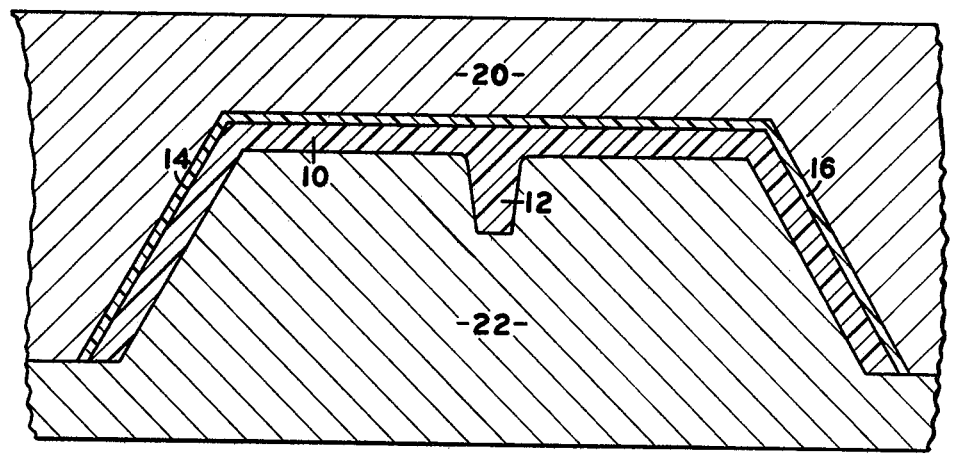
FIG. 5 is a cross-section of a typical compression mold set-up.

The following example is included to illustrate the correlation between the molding pressure for the second closing of the mold and the configuration of the sink mark after the in-mold coating. The example involves a box-shaped, glass-reinforced polyester resin article having several internal reinforcing ribs and a cylindrical boss. The article was molded as shown in the cross-section of FIG. 5, illustrating the formation of a molded article 10 between a male mold 20 and a female mold 22. The article 10 includes a rib 12 and a surface 14, opposite the rib, on which the coating 16 (exaggerated for illustration purposed) is to be applied to fill any surface defects and generally improve the surface finish. Typical compression molding pressures range from about 500 psi. to about 2000 psi. and the parts in this example were molded at about 1000 psi. The molding pressure for the second mold closing would be somewhere in the range of about 300 to about 1000 psi., but generally from about 400 to about 600 psi. Because the optimum pressure for the second mold closing appears to be related to the physical dimensions of the article, the ribs, etc., these dimensions will be given in each part of the example. Aside from the ribs and the boss, the bottom of the article had a generally uniform thickness of about 0.1 inches and a surface area of about 139 square inches, thus making it possible to convert the total molding pressure, expressed in tons, to lbs./square inch (psi.). In each part of the example, the "0" reading in the "tons" and "psi." columns merely refers to the control, i.e., the part to which no coating was applied. The column headed "Surface" gives the depth, in mils, of the sink mark (minus sign) or the height of the raised area (no sign) after the cycle is completed and the part has cooled. All of the measurements (in mils) in this example were made with a Model No. S2 profilometer, sold by the Micrometrical Mfg. Co. In addition, the table of data for each location includes an estimate of the molding pressure at which a surface reading of 0.0 mils (perfectly flat) would have occurred. The example should be read in conjunction with FIG. 2, a cross section (of either a rib or a boss) illustrating the dimensions referred to in the example. The thickness of the in-mold coating was, on the average, from about 2 mils to about 5 mils.

Rib #1

This rib has a "depth" of 1.0 inches, a "width" of 0.1 inches and a "width + fillets" of 1.1 inches.

| Pressure tons | (kg.) | psi. | pascal | Surface mils | (m.m.) |
|---|---|---|---|---|---|
| 0 | 0 | 0 | 0 | −1.2 | .03048 |
| 10 | 9071 | 143 | 9.85950 × 10⁵ | −.8 | .02032 |
| 25 | 22,679 | 360 | 24.82113 × 10⁵ | −.8 | .02032 |
| — | — | 460 | 31.71588 × 10⁵ | 0.0 | 0 |
| 45 | 40,823 | 640 | 44.12644 × 10⁵ | .66 | .01676 |
| 60 | 54,430 | 853 | 58.81229 × 10⁵ | .75 | .01905 |
| 100 | 90,710 | 1430 | 98.59503 × 10⁵ | 1.1 | .02794 |
| 175 | 158,756 | 2518 | 173.47208 × 10⁵ | 1.6 | .04064 |
| 240 | 217,723 | 3412 | 235.24911 × 10⁵ | 1.9 | .04826 |

Rib #2

This rib also had a "depth" of 1.0 inches (2.54 cm.) and a "width" of 0.1 inches (0.254 cm.), but had a "width + fillets" of 0.6 inches (1.52 cm.).

| Pressure tons | (kg.) | psi. | pascal | Surface mils | (m.m.) |
|---|---|---|---|---|---|
| 0 | 0 | 0 | 0 | −1.1 | .02794 |
| 10 | 9071 | 143 | 9.85950 × 10⁵ | −.35 | .00889 |
| 25 | 22,679 | 360 | 24.82113 × 10⁵ | −.38 | .00965 |
| — | — | 530 | 36.54221 × 10⁵ | 0.0 | 0 |
| 45 | 40,823 | 640 | 44.12644 × 10⁵ | .58 | .01473 |
| 60 | 54,430 | 853 | 58.81229 × 10⁵ | .97 | .02463 |
| 100 | 90,710 | 1430 | 98.59503 × 10⁵ | .58 | .01473 |
| 175 | 158,756 | 2518 | 173.47208 × 10⁵ | .70 | .01778 |
| 240 | 217,723 | 3412 | 235.24911 × 10⁵ | .97 | .02463 |

Boss

The boss had a "width," or diameter, of 1.0 inches, a "depth" of 2.4 inches, and a "width + fillets" of 1.25 inches.

| Pressure tons | (kg.) | psi. | pascal | Surface Mils | (m.m.) |
|---|---|---|---|---|---|
| 0 | 0 | 0 | 0 | −.91 | .02311 |
| 10 | 9071 | 143 | 9.85950 × 10⁵ | −.37 | .00939 |
| 25 | 22,679 | 360 | 24.82113 × 10⁵ | −.42 | .01066 |
| — | — | 480 | 33.09483 × 10⁵ | 0.0 | 0 |
| 45 | 40,823 | 640 | 44.12644 × 10⁵ | .48 | .01219 |
| 60 | 54,430 | 853 | 58.81229 × 10⁵ | .70 | .01778 |
| 100 | 90,710 | 1430 | 98.59503 × 10⁵ | .78 | .01981 |
| 175 | 158,756 | 2518 | 173.47208 × 10⁵ | 1.68 | .04267 |
| 240 | 217,723 | 3412 | 235.24911 × 10⁵ | 1.56 | .03962 |

In view of the difficulty of accurately measuring sinks and raised areas, it will be understood that the foregoing figures are not to be interpreted as absolute values, but only as illustrating a trend in support of the hypothesis that increased molding pressure for the in-mold coating step will decrease the depth of the sink or increase the height of the rasied area. It should also be noted that large areas of compression molded parts, which are expected to be flat, are actually wavy on the microscale.

It has been found possible with the use of the in-mold coating process of the present invention to greatly reduce the amount of waviness present in the surface, thereby improving the surface finish and surface gloss.

THE COATING COMPOUND

The compound in an isocyanate-based material, the isocyanate portion providing the necessary adhesion to the FRP part while the remaining portion provides the hardness, tensile strength, surface finish, etc.

Before the chemical composition of the coating compound is discussed, the physical properties which it must possess should be described. The compound must possess certain characteristics that are common to all molding compounds. Among these, the compound must be capable of flowing under pressure to cover the part completely with a homogeneous skin. The viscosity must not be low enough, however, that the compound will be squeezed out of the mold during the press closing. The compound must reach a satisfactory state of cure at the molding temperature (generally about 300° F) in a reasonable period of time. On the other hand, the rate of cure must not be so rapid as to cause scorching of the compound, incomplete wetting, or incomplete coverage of the part before the mold is completely closed. The integrity and durability of the cured coating must be such that it is not prone to scratching or abrasion during normal handling, especially at the elevated curing temperatures involved. An additional property that the compound must have, which is not possessed by conventional molding compounds, is the ability to form a film that adheres well to the FRP substrate even with no prior treatment of the substrate surface. This adhesion must be such that a minimum of interfacial failure occurs, even if the surface of the part had defects or is damaged. Also, the cured coating must release easily from the chromed surfaces of the mold.

The first component of the coating composition is an isocyanate-terminated material (hereinafter also referred to as a "polyisocyanate"), which has excess NCO groups available for later reactions. This material may be a urethane "prepolymer" such as can be prepared by reacting an organic polyhydroxy with a polyisocyanate under conditions whereby the number of NCO groups supplied exceeds the number of reactive hydrogen atoms. The resulting prepolymer is free of reactive H, but has a substantial number of NCO groups for later reaction. The isocyanate-terminated material may also be a "semi-" or "quasi-" pre-polymer, the preparation of which is well known in the art.

Therefore, as used herein, the term "isocyanate-terminated material" is intended to mean and include any relatively low molecular weight (generally non-solid) material containing terminal NCO groups, whether such groups terminate the main (longest) chain or a shorter pendent chain. The other requirement for this material is that it contain an excess of unreacted NCO group available for later reaction (e.g., trimerization or urethane formation).

A wide variety of polyisocyanate compounds can be used. Examples of suitable organic polyisocyanates include the isomers and isomeric mixtures of tolylene diisocyanate, diphenylmethane-4,4' diisocyanate, 1,5-naphthalene-diisocyanate, cumene-2,4-diisocyanate, 4-methoxy-1,3-phenylene-diisocyanate, 4-chloro-1,3-phenylene-diisocyanate, dicyclohexylmethane-4,4-diisocyanate, 4-bromo-1,3-phenylenediisocyanate, 4-ethoxy-1,3-phenylenediisocyanate, 2,4'-diisocyanatodiphenylether, 5,6-dimethyl-1,3-phenylenediisocyanate, 2,4-dimethyl-1,3-phenylene-diisocyanate, 4,4'-diisocyanatodiphenylether, benzidinediisocyanate, 4,6-dimethyl-1,3-phenylenediisocyanate, 1,10-anthracenediisocyanate, 4,4'-diisocyanatodibenzyl, simple or polymeric diphenylmethane-diisocyanates such as 3,3-dimethyl-4,4'-diisocyanatodiphenyl, 2,4-diisocyanatostilbene, 3,3'-dimethyl-4,4'-diisocyanatodiphenyl, 1,4-anthracenediisocyanate, 2,5-fluorenediisocyanate, 1,8-naphthalenediisocyanate, 2,6-diisocyanatobenzfuran and 2,4,6-toluenetriisocyanate. It is to be understood that mixtures of two or more of these polyisocyanates can be employed. Aromatic isocyanates are preferred, particularly the MDI (di-phenylmethane-4,4" diisocyanate), and hydrogenated MDI.

The polyisocyanate may then be reacted (to yield the coating compound) in one of several ways. The first approach attempted involved the addition of a suitable catalyst to the polyisocyanate causing the terminal NCO groups to trimerize, as is well known in the art, forming a trimer of the following general formula:

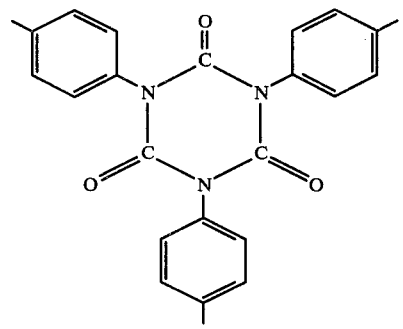

The second approach involved a conventional urethane reaction of the type wherein, for example, a polyhydroxyl compounds reacts with a polyisocyanate, when thermally catalyzed, to yield a urethane-based polymer according to the following:

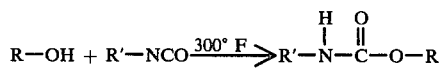

It is because of this reaction, which proceeds slowly even at room temperature, that the polyisocyanate and the polyhydroxyl compound must be kept separate until soon before the coating compound is needed. Between the two approaches discussed, the latter is preferred, because it has been found to be more difficult to control the trimerization reaction of the first approach.

The coating compound preferably contains a polyester which may be present in either the polyisocyanate or the polyhydroxyl compound or both. The polyester may be in the form of a solution of unsaturated polyester in styrene monomer which, with the addition of an appropriate initiator, such as tertiary butyl perbenzoate, crosslinks as is well known in the art to form a high molecular weight polymer.

The other major component, in addition to the source of NCO, is the source of H atoms, which is generally a polyhydroxyl compound such as a polyol, or possibly, a polyester (saturated or unsaturated). For the purpose of the final reaction, it is desirable that there be approximate molar equivalency between the total numbers of NCO groups and the hydroxyl groups (or reactive hydrogen atoms).

Suitable polyols include diols such as glycols, and the like; triols such as glycerol, trimethylolpropane, butane-triols, hexane-troils, tetrols such as erythritol and penta-erythritol; pentols; hexols such as sorbitol and mannitol; and other mixcellaneous higher functional alcohols. Other polyhydroxyl materials useable are unsaturated compounds containing polymerizable carbon-to-carbon double bonds, such as unsaturated polyester in solution in styrene monomer; and methacrylates such as a partially esterified trimethylol propane trimethacrylate, containing residual hydroxyl groups.

A third major component in the compound is the mold release agent which may not necessarily be selected from any of those normally used in molding compounds. Metallic soaps such as zinc stearate and some of the others most commonly used act as catalysts for the isocyanate polymerization and may reduce the cure time of the coating compound to an unacceptably low level, thus possibly preventing sufficient "wetting" of the surface of the FRP substrate. Too short a cure time may also interfere with proper adhesion of the coating compound to the substrate. Release agents such as the natural product Lecithin and du Pont's Zelec UN aliphatic phosphate have performed satisfactorily. Various other common additives are normally added to either the polyisocyanate or the polyhydroxyl compound, such as talc extenders, flexibilizers and colloidal silica, in accordance with standard molding practice. It has been found that the practice of the present invention, with a pigment added to the coating composition, makes it possible to fill sink marks and other defects, seal the pores, and provide a glossy, pigmented surface all in one operation, so that as the part is removed from the mold at the end of the second cycle, it is ready for use without any additional operations or hand repairing, sanding, finishing or other such extra process steps as have been necessary.

The following example is included to aid one skilled in the art in practicing this invention and the recipies presented therein are not intended, either singly or in combination, to limit the invention, which is properly delineated in the claims.

EXAMPLE 2

The selection of an appropriate in-mold coating composition is illustrated by this example, in which each ingredient is given with its respective number of parts, by weight.

A

A urethane "prepolymer" was prepared by mixing, and heating for one hour at 105° C., the following:

| Ingredient | Parts |
|---|---|
| PPG-1025 (1) | 45 |
| PPG-425 (2) | 42 |
| TDI (3) | 69 |
| Talc | 37.4 |

Notes:
(1) Polypropylene glycol, 1025 m.w., Union Carbide Corp.
(2) Polypropylene glycol, 425 m.w., Union Carbide Corp.
(3) 80/20 mixture of 2,4-/2,6-tolylene diisocyanate.

To this urethane prepolymer there was added 2.0 parts of zinc stearate and 2.9 parts of Triazine, N-N Tris (dimethylaminopropyl)hexahydro triazine, which catalyzed the trimerization of the terminal isocyanate groups of the prepolymer. The resulting mixture was then used as the in-mold coating composition, immediately after combining the prepolymer and the triazine, with the mixture curing to form the trimer illustrated previously.

B

A urethane prepolymer was prepared in the same manner as in A above, but with the ingredients in the following proportions, and with a letter after an ingredient indicating the sample in which the particular ingredient first appeared and was footnoted.

| Ingredient | Parts |
|---|---|
| PPG-1025 (A) | 23 |
| PPG-425 (A) | 21.5 |
| TDI (A) | 35.3 |
| Talc | 19.1 |

A mixture was also made from the following:

| Ingredient | Parts |
|---|---|
| Koppers B-78-130 (4) | 97.56 |
| Zinc Stearate | 1.98 |
| TBP (5) | 1.50 |
| Triazine | 1.50 |

Notes:
(4) A solution of unsaturated polyester in styrene monomer, Koppers Corp.
(5) Tertiary butyl perbenzoate, a peroxide initiator for the polyester and styrene reaction.

Just before molding, the prepolymer and the mixture were combined with the result that the cross-linked polyester and styrene formed a linear polymer with the prepolymer and the excess isocyanate groups (from the TDI) causing additional urethane formation, while the Triazine catalyzed the trimerization of the final composition, as in A, above.

C

A urethane prepolymer was prepared as in B, with MDI replacing TDI as follows:

| Ingredient | Parts |
|---|---|
| PPG-1025 (A) | 18.1 |
| PPG-425 | 16.9 |
| MDI (6) | 45.0 |
| Talc | 20.1 |

Notes:
(6) Diphenylmethane-4,4' diisocyanate, having the following general structure:

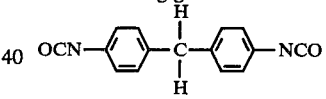

A mixture was made as follows:

| Ingredient | Parts |
|---|---|
| Koppers B-78-130 (B) | 89.7 |
| Zinc Stearate | 8.1 |
| TBP (B) | 2.2 |
| Triazine | 1.0 |

The rest of the Process and the reactions were the same as B above, except for the replacement of TDI by MDI.

D

A urethane prepolymer was formed by mixing, and heating for 1 hour at 100° C., the following:

| Ingredient | Parts |
|---|---|
| PCP 0200 (7) | 24.7 |
| Isonate 143L (8) | 41.1 |
| Talc | 15.1 |
| Lecithin release agent | 1.0 |

(7) A polycaprolactone, a hydroxy-terminated, saturated polyester, Union Carbide Corp.
(8) A liquid which is essentially diphenylmethane-4,4' diisocyanate, Upjohn.
(9) A tetrol, a propylene oxide adduct of pentaerythritol, Wyandotte.

Just before molding, the prepolymer was mixed with 18.1 parts of PEP 450 (9), which reacted in the mold with both the prepolymer and the excess MDI in a normal urethane reaction to produce a highly crosslinked urethane coating composition.

E

A urethane prepolymer, having a large molar excess of MDI, was made, the same as in D, from the following:

| Ingredient | Parts |
| --- | --- |
| Isonate 143L (D) | 18.01 |
| Polyethylene butylene adipate flexibilizer (m.w. about 2500) | 10.81 |

Another mixture, kept separate from the prepolymer was made from the following:

| Ingredient | Parts |
| --- | --- |
| Experimental polyester in styrene (10) | 37.27 |
| PEP 450 (D) | 10.56 |
| Talc | 20.75 |
| TBP (B) | .56 |
| Zelec UN (11) | .06 |
| Cabosil M5 (12) | 1.96 |

Notes:
(10) An unsaturated, hydroxy-terminated polypropylene fumarate, 2500 m.w. (see U.S. Pat. No. 3,538,043).
(11) A release agent, Du Pont.
(12) A thixotropic agent, Cabot Corp.

The polyester and styrene crosslink as in B above, the prepolymer and the excess MDI react with the polyester and the terminal OH groups of the PEP 450 by means of the normal urethane reactions to form a crosslinked coating composition, during the molding cycle.

F

A urethane prepolymer was formed by mixing, and heating for 1 hour at 100° C., the following:

| Ingredient | Parts |
| --- | --- |
| Isonate 143L (D) | 7.25 |
| Ethylene butylene adipate (m.w. 2500) | 4.35 |
| Cabosil M5 (E) | 1.2 |

In addition, a mixture was made of the following:

| Ingredient | Parts |
| --- | --- |
| TMPTMA (13) | 15 |
| PEP 450 (D) | 8.35 |
| Zelec UN (E) | .025 |
| TBP (B) | .075 |
| 10% D22 in styrene monomer (14) | .075 |

Notes:
(13) Trimethylol propane trimethacrylate, having residual hydroxyl groups and an OH No. of 40, sold under the trademark "Chemlink 3080", Ware Chemical Corp.
(14) D22 is an isocyanate catalyst, dibutyl tin dilaurate, Union Carbide Corp.

The TMPTMA polymerizes with itself through the carbon-carbon double bonds in its structure, while the prepolymer and the excess MDI react with the terminal hydroxyl groups c both the PEP 450 and TMPTMA to form a crosslinked urethane coating composition, during the molding cycle. In a modification of the above, the amount of adipate was increased and the amount of TMPTMA decreased, resulting in a more flexible coating.

It will be appreciated that the formula of F is very similar to that of E, the major difference being the use in F of a commercially available monomer mixture (TMPTMA) rather than the polypropylene fumarate which is experimental.

G

A urethane prepolymer was formed as in Example F, from the following:

| Ingredient | Parts |
| --- | --- |
| Hylene W (15) | 4.85 |
| Ethylene butylene adipate (m.w. 2500) | 2.90 |
| Cabosil M5 (E) | 1.20 |

Note:
(15) An hydrogenated MDI, du Pont, having the following structure:

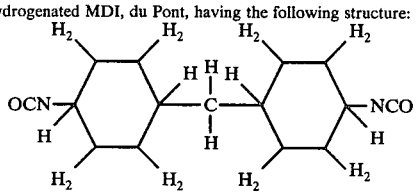

A second mixture was made from the following:

| Ingredient | Parts |
| --- | --- |
| TMPTMA (F) | 10.0 |
| Talc | 5.5 |
| PEP 450 (D) | 2.9 |
| Zelec UN (E) | .025 |
| TBP (B) | .15 |
| 2% benzoquinone in styrene (16) | |
| 10% D22 in styrene (F) | .05 |

Note:
(16) An inhibitor for the TMPTMA free radical reaction.

All reactions are the same as in F, except that the use of the hydrogenated MDI overcomes the problems associated with the UV stability of the MDI-urethane bond.

H

As mentioned previously, if the gel time (or cure time) for the coating composition is too short, adhesion between the coating and the substrate will be adversely affected. Therefore, most commercially available unsaturated polyesters aren't suitable for use herein because they contain a condensation catalyst which also acts as a catalyst for the urethane reaction. Certain polyesters, such as Koppers B-78-130, are marginally acceptable at molding temperatures of about 300° F, while most other commercial polyesters are not.

An unsaturated polyester, similar to those commercially available, was prepared by thermally condensing maleic anhydride and 1,2-propanediol without the use of a catalyst. The result was a polypropylene fumarate, m.w. about 1500 and COOH No. 13, which was dissolved in styrene monomer (65% fumarate, 35% styrene). An in-mold coating composition was made by mixing the following:

| Ingredient | Parts | |
| --- | --- | --- |
| Polypropylene fumarate in styrene monomer | 15.00 | |
| PEP 450 (D) | 4.25 | |
| Talc | 8.35 | A |

| Ingredient | Parts | |
|---|---|---|
| TBP (B) | .225 | |
| Zelec UN (E) | .025 | |
| Isonate 143L (D) | 7.2 | B |
| Ethylene butylene adipate (m.w. 2500) | 4.4 | |

When applied in accordance with the invention, this coating composition provided excellent adhesion to the FRP substrate.

While the term "isocyanate-based" coating as used herein and in the claims is intended to include the trimer of examples A,-B and-C as well as the true urethane of D,-E,-F and-G, the latter type of compound is preferred. In view of the importance of the physical properties of the coating, the following table presents selected properties for preferred compounds, with the letters under "Sample" indicating the particular composition from Example 2. Note in connection with the hardness values that for the particular FRP recipe given above for the substrate, the hardness value is 116.

Table 1

| Property | Sample | | |
|---|---|---|---|
| | D | E | F |
| Tensile strength (psi.) | 6840 | 5814 | 6065 |
| Elongation to break | 3% | 3% | 4.5 |
| Hardness (Rockwell "R") | 53 | 102 | — |
| Young's Modulus (psi. ×10$^5$) | 2.75 | 3.25 | 2.85 |

In addition to covering surface defects, the coating compositions and methods described herein may perform the function of improving the surface properties of the FRP substrate and/or imparting particular characteristics thereto, by the use of certain additives. One of the most useful of such additives is carbon black which not only can serve as a black pigment, but also can provide a coating which is electrically conductive, if one of the continuous-network, conductive carbon blacks is used. Such a coating enables the FRP part to be electroplated or electrostatically painted (liquid or powder coated) or may serve as an electromagnetic shield or reflector.

This example is included to illustrate the use of a conductive additive. An in-mold coating composition was prepared as follows (letters refer to samples from Example 2):

| Ingredient | Parts |
|---|---|
| Experimental polyester in styrene (E) | 15.0 |
| PEP 450 (D) | 4.25 |
| Vulcan XC-72 (1) | 4.0 |
| TBP (B) | .225 |
| Zelec UN (E) | .025 |
| MDI/adipate (2) | 11.6 |

(1) A conductive, continuous-network carbon black, Cabot Corp.
(2) A 10/6 mixture of Isonate 143L, essentially liquid MDI, Upjohn and polyethylene butylene adipate.

After this coating was molded onto the FRP substrate, an electrical resistance measurement was made between two points 10 inches (25.4 cm.) apart. The resistance was about 1000 ohms, compared to a resistance of 50 megohms across a similar area of a part coated in accordance with the invention, but with no carbon black.

Other additives may be used for decorative purposes in addition to, or in place of pigments. An example especially useful for automotive parts would be metal flakes or other similar "incompatible" components, i.e., those which will remain as a separate phase in the cured coating composition.

The physical properties (e.g., tensile strength, impact strength and modulus) may be improved by the addition of reinforcing fibers, preferably glass fibers. Because the coating is thin, the fibers should be very short, generally ¼ inch or less and should not comprise more than about 20 percent by weight of the coating composition. Among the other physical properties which may be altered by means of additives to the coating composition are the coefficient of friction, the scratch resistance, the resistance to weather, resistance to certain types of radiation damage, such as UV rays, and resistance to chemical attack and corrosion, as well as impact resistance.

The invention has been described in great detail sufficient to enable one of ordinary skill in the art to make and use the same. Obviously, modifications and alterations of the preferred embodiments will occur to others upon a reading and understanding of the specification and it is our intention to include all such modifications and alterations as part of our invention insofar as they come within the scope of the appended claims.

We claim:

1. A method of providing a compression or injection molded completely cured reinforced thermoset article with a coating to eliminate surface defects, (1) the composition of said thermoset article comprising a completely cured unsaturated polyester-crosslinkable monomer compound reinforced with glass fibers and containing a low shrink additive and a filler (2) said article having integrally molded an outer surface, at least one boss and/or at least one rib, said boss and/or said rib being opposite to said surface, and (3) said surface having defects comprising sink marks, pores, microcracks, open knit lines and waviness, comprising:
  a. placing on said outer surface of said article in a mold a charge of a curable thermosetting coating composition, said charge being sufficient to provide on said surface a coating having a thickness of less than about twenty mils;
  b. closing the mold and applying sufficient pressure to said charge to cause the coating composition to substantially uniformly cover and penetrate said surface, the coating composition including a mold release agent and
    (i) an isocyanate-terminated material containing unreacted isocyanate groups, and
    (ii) a composition containing reactive hydrogen atoms for reaction with (i);
  c. curing said coating composition in said mold under heat and pressure to bond said coating composition to said surface; and
  d. removing said coated article from said mold, providing said article with a substantially smooth defect-free crosslinked-isocyanate based coating bonded to said surface of said article.

2. The product produced by the method of claim 1.

3. The method of claim 1 where said cross-linkable monomer is styrene.

4. The method of claim 1 wherein said pressure is in the range of from about 300 to about 1000 psi.

5. The method of claim 1 wherein said isocyanate terminated material contains a compound selected from the group consisting of tolylene diisocyanate, diphenylmethane-4,4' diisocyanate, and dicyclohexylmethane-4,4' diisocyanate.

6. The method of claim 1 wherein said charge is sufficient to provide on the surface a coating having a thickness of from about 0.5 to about 5.0 mils.

7. The method of claim 1 wherein said isocyanate terminated material is an isocyanate terminated polyurethane prepolymer containing excess diisocyante.

8. The method of claim 1 wherein said material containing reactive hydrogen atoms is a hydroxy-terminated polyester.

9. The method of claim 8 wherein said material containing reactive hydrogen atoms is a compound having polymerizable carbon-to-carbon double bonds.

10. The method of claim 9 wherein (ii) contains additionally styrene.

11. A method of providing a compression or injection molded completely cured thermoset article with a coating substantially free of surface defects comprising:
 a. depositing in a mold a thermosetting composition comprising an unsaturated polyester resin, a crosslinkable monomer, a low shrink additive, a filler, glass fibers and a polymerization initiator for said polyester and cross-linkable monomer;
 b. compression or injection molding said thermosetting composition to provide a compression of injection molded completely cured thermoset polyester resin glass fiber article having an integrally molded outer surface, at least one boss and/or at least one rib, said boss and/or said rib being opposite to said surface, and said surface exhibiting as defects sink marks, pores, microcracks, open knit lines and waviness,
 c. opening said mold and placing on said outer surface in said mold a charge of a curable thermosetting coating composition, said charge being sufficient to provide on said surface a coating having a thickness of less than about twenty mils;
 d. closing said mold and applying sufficient pressure to said charge to cause said coating composition to substantially cover uniformly the entire area of and penetrate said surface, said coating composition including a mold release agent and
  (i) an isocyanate-terminated material containing unreacted isocyanate groups, and
  (ii) a composition containing reactive hydrogen atoms for reaction with (i);
 e. curing said coating composition in said mold under heat and pressure to bond said coating composition to said surface; and
 f. removing said coated article from said mold, providing said article with a substantially continuous smooth defect-free crosslinked-isocyanate based coating adhered tightly to said surface of said article.

12. The method according to claim 11 where said cross-linkable monomer is styrene.

13. The molded, composite article produced by the method of claim 11.

14. The method of claim 11 wherein said molding pressure in e) is from about 300 psi to about 1000 psi.

15. The method of claim 11 wherein said coating composition contains less than about twenty percent by weight of inorganic filler.

16. The method of claim 11 wherein said coating composition includes an effective amount of a pigment to yield a smooth pigmented article.

17. The molded, composite article produced by the method of claim 16.

18. A method of providing a compression or injection molded completely cured reinforced thermoset article with a coating to eliminate surface defects, (1) the composition of said thermoset article comprising a completely cured unsaturated polyester-crosslinkable monomer compound reinforced with glass fibers and containing a low shrink additive and a filler, (2) said article having an outer surface, and (3) said surface having defects comprising pores, comprising:
 a. placing on said outer surface of said article in a mold a charge of a curable thermosetting coating composition, said charge being sufficient to provide on said surface a coating having a thickness of less than about 20 mils;
 b. closing the mold and applying sufficient pressure to said charge to cause the coating composition to substantially uniformly cover and penetrate said surface, the coating composition including a mold release agent and
  (i) an isocyanate-terminated material containing unreacted isocyanate groups, and
  (ii) a composition containing reactive hydrogen atoms for reaction with (i);
 c. curing said coating composition in said mold under heat and pressure to bond said coating composition to said surface; and
 d. removing said coated article from said mold, providing said article with a substantially smooth defect-free crosslinked-isocyanate based coating bonded to said surface of said article.

19. A method according to claim 18 where said crosslinkable monomer is styrene and where said material containing reactive hydrogen atoms is a hydroxy-terminated polyester having polymerizable carbon-to-carbon double bonds containing additionally styrene.

20. A method of providing a compression or injection molded completely cured thermoset article with a coating substantially free of surface defects comprising:
 a. depositing in a mold a thermosetting composition comprising an unsaturated polyester resin, a crosslinkable monomer, a low shrink additive, a filler, glass fibers and a polymerization initiator for said polyester and crosslinkable monomer;
 b. compression or injection molding said thermosetting composition to provide a compression or injection molded completely cured thermoset polyester resin glass fiber article having an integrally molded outer surface, said surface having defects comprising pores,
 c. opening said mold and placing on said outer surface in said mold a charge of a curable thermosetting coating composition, said charge being sufficient to provide on said surface a coating having a thickness of less than about 20 mils;
 d. closing said mold and applying sufficient pressure to said charge to cause said coating composition to substantially cover uniformly the entire area of and penetrate said surface, said coating composition including a mold release agent and
  (i) an isocyanate-terminated material containing unreacted isocyanate groups, and
  (ii) a composition containing reactive hydrogen atoms for reaction with (i);
 e. curing said coating composition in said mold under heat and pressure to bond said coating composition to said surface; and f. removing said coated article from said mold, providing said article with a substantially continuous smooth defect-free crosslinked-isocyanate based coating adhered tightly to said surface of said article.

21. A method according to claim 20 where said crosslinkable monomer is styrene and where said material containing reactive hydrogen atoms is a hydroxy-terminated polyester having polymerizable carbon-to-carbon double bonds containing additionally styrene.

* * * * *